(12) United States Patent
Watanabe et al.

(10) Patent No.: US 9,340,459 B2
(45) Date of Patent: May 17, 2016

(54) DISK ROLL AND BASE MATERIAL THEREOF

(71) Applicant: NICHIAS CORPORATION, Tokyo (JP)

(72) Inventors: Kazuhisa Watanabe, Tokyo (JP); Tetsuya Mihara, Tokyo (JP); Taichi Shiratori, Tokyo (JP)

(73) Assignee: NICHIAS CORPORATION, Tokyo (JP)

(*) Notice: Subject to any disclaimer, the term of this patent is extended or adjusted under 35 U.S.C. 154(b) by 0 days.

(21) Appl. No.: 14/849,756

(22) Filed: Sep. 10, 2015

(65) Prior Publication Data

US 2015/0376065 A1 Dec. 31, 2015

Related U.S. Application Data

(63) Continuation of application No. 14/175,345, filed on Feb. 7, 2014, now Pat. No. 9,162,916.

(60) Provisional application No. 61/774,060, filed on Mar. 7, 2013.

(30) Foreign Application Priority Data

Feb. 7, 2013 (JP) ................. 2013-022417
May 24, 2013 (JP) ................. 2013-109457

(51) Int. Cl.
*B32B 9/00* (2006.01)
*B32B 19/00* (2006.01)
*C04B 33/36* (2006.01)
(Continued)

(52) U.S. Cl.
CPC .............. *C04B 33/36* (2013.01); *C03B 35/181* (2013.01); *C03B 35/189* (2013.01); *C04B 35/622* (2013.01); *C04B 2235/3217* (2013.01); *C04B 2235/349* (2013.01); *C04B 2235/3418* (2013.01); *C04B 2235/5228* (2013.01); *C04B 2235/5292* (2013.01); *C04B 2235/612* (2013.01);
(Continued)

(58) Field of Classification Search
CPC ......... C04B 41/009; F16C 13/00; B41N 7/06; B21B 27/00; B32B 15/011
USPC .................................. 428/688, 689, 699, 702
See application file for complete search history.

(56) References Cited

U.S. PATENT DOCUMENTS 4,416,043 A * 11/1983 Aoki ................. F27D 3/026
492/59
6,534,176 B2 * 3/2003 Terase ................... C01B 33/12
106/492

(Continued)

FOREIGN PATENT DOCUMENTS

JP 58-156717 9/1983
JP 2004-299980 10/2004
(Continued)

OTHER PUBLICATIONS

International Search Report issued in PCT/JP2013/007638 dated Feb. 4, 2014.
(Continued)

*Primary Examiner* — Noah Wiese
(74) *Attorney, Agent, or Firm* — Nixon & Vanderhye P.C.

(57) ABSTRACT

A base material for a disk roll including ceramic fibers, an inorganic binder and scaly silica.

6 Claims, 1 Drawing Sheet

(51) Int. Cl.
*C03B 35/18* (2006.01)
*C04B 35/622* (2006.01)

(52) U.S. Cl.
CPC ......... *C04B2235/77* (2013.01); *C04B 2235/96* (2013.01); *Y10T 29/49554* (2015.01)

(56) References Cited

U.S. PATENT DOCUMENTS

| | | | |
|---|---|---|---|
| 6,896,646 B2 | 5/2005 | Kaiser et al. | |
| 7,284,328 B2 | 10/2007 | Kaiser et al. | |
| 7,507,194 B2 | 3/2009 | Neubauer et al. | |
| 7,597,781 B2 * | 10/2009 | Katagiri | D21H 13/38 162/181.6 |
| 7,842,632 B2 | 11/2010 | Neubauer et al. | |
| 8,080,098 B2 * | 12/2011 | Kurihara | C09D 11/18 106/31.25 |
| 8,261,448 B2 | 9/2012 | Neubauer et al. | |
| 2003/0181302 A1 | 9/2003 | Kaiser et al. | |
| 2004/0220032 A1 | 11/2004 | Nakayama et al. | |
| 2005/0212158 A1 | 9/2005 | Kaiser et al. | |
| 2007/0203259 A1* | 8/2007 | Kurihara | C09D 11/18 401/209 |
| 2007/0274617 A1* | 11/2007 | Shibahara | F16C 17/107 384/107 |
| 2007/0292673 A1* | 12/2007 | Katagiri | D21H 13/38 428/219 |
| 2008/0120995 A1 | 5/2008 | Neubauer et al. | |
| 2009/0149310 A1 | 6/2009 | Neubauer et al. | |
| 2010/0113238 A1 | 5/2010 | Horiuchi et al. | |
| 2011/0023547 A1 | 2/2011 | Neubauer et al. | |
| 2011/0287915 A1 | 11/2011 | Horiuchi et al. | |
| 2011/0287916 A1* | 11/2011 | Watanabe | B65H 27/00 492/40 |
| 2011/0318631 A1* | 12/2011 | Nomura | H01G 9/02 429/144 |
| 2012/0272686 A1* | 11/2012 | Horiuchi | C03B 13/16 65/90 |
| 2013/0174609 A1 | 7/2013 | Watanabe et al. | |

FOREIGN PATENT DOCUMENTS

| | | |
|---|---|---|
| JP | 2005-169435 | 6/2005 |
| JP | 2006-143666 | 6/2006 |
| JP | 2007-197264 | 8/2007 |
| JP | 2009-132619 | 6/2009 |
| JP | 2010-510956 | 4/2010 |
| JP | 2011-241920 | 12/2011 |
| JP | 4920118 | 2/2012 |
| JP | 5134163 | 11/2012 |

OTHER PUBLICATIONS

Office Action for Korean Patent Application No. 10-2013-0063456.
Decision of Grant for Korean Patent Application No. 10-2013-0063456.

* cited by examiner

DISK ROLL AND BASE MATERIAL THEREOF

This application is a continuation of application Ser. No. 14/175,345 filed Feb. 7, 2014 and claims priority to Japanese Patent Application Nos. 2013-109457 and 2013-22417 filed May 24, 2013 and Feb. 7, 2013, respectively, as well as U.S. Provisional Application No. 61/774,060, filed Mar. 7, 2013, the entire contents of each of which are hereby incorporated by reference.

TECHNICAL FIELD

The invention relates to a disk roll suited for the production of plate glass and a base material thereof.

BACKGROUND ART

Plate glass is produced by continuously supplying to an apparatus a glass melt, allowing the glass melt to be flown down from the apparatus in the form of a belt, and curing by cooling during the flowing. Disk rolls act as a pair of tensile rolls and are used to hold the belt-like glass melt therebetween and forcedly send it downward.

In addition to the above-mentioned down draw method, the plate-shaped glass can be produced by the float method, the roll-out method, the Colburn method, or the like. Glass plate produced by any of the above-mentioned methods requires an annealing process in order to remove strain by heat. A disk roll, serving as a roller, is used to convey the glass plate during this annealing process.

In general, a disk roll is obtained by fitting by insertion to a shaft (served as a rotation shaft) a plurality of disks obtained by punching a mill board (plate-like molded product, base material) in the form of a ring to obtain a roll-like stack, and applying a pressure to the entire stack through flanges provided at both ends. The outer peripheral surface of the disks functions as the conveying surface of a glass melt.

Since a disk roll conveys a glass melt for a long period of time, it is required to have not only heat resistance but also wear resistance, flexibility for protecting the glass surface from scratches, and hardness. Disk rolls containing heat-resistant inorganic fibers, mica and clay are known (Patent Documents 1 to 3). Further, a disk roll using a filler other than mica is also known (Patent Document 4).

RELATED ART DOCUMENTS

Patent Documents

Patent Document 1: JP-T-2010-510956
Patent Document 2: JP-A-2009-132619
Patent Document 3: JP-A-2004-299980
Patent Document 4: Japanese Patent No. 4920118

SUMMARY OF THE INVENTION

However, glass containing mica may be scratched easily. Further, in respect of variation or substitutability of the raw materials, production of a disk roll without using mica as an essential component has been desired. Patent Document 4 discloses a disk roll containing alumina (sphere) or the like, but it has poor wear resistance.

The invention is aimed at providing, without using mica as an essential component, a disk roll having well-balanced wear resistance and change percentage of outer diameter, and a base material thereof.

According to one embodiment of the invention, the following base material for a disk roll or the like are provided.

1. A disk roll base material comprising ceramic fibers, an inorganic binder and scaly silica.
2. The disk roll base material according to 1, wherein the scaly silica is a secondary aggregate in which the scaly silica is piled in parallel with each other or a tertiary aggregate in which a plurality of the secondary aggregates are aggregated.
3. The disk roll base material according to 1 or 2, which comprises:
   30 to 50 wt % of the ceramic fibers;
   5 to 50 wt % of the inorganic binder; and
   5 to 50 wt % of the scaly silica.
4. The disk roll base material according to any of 1 to 3, wherein the inorganic binder is kibushi clay and bentonite.
5. The disk roll base material according to any of 1 to 4, wherein the ceramic fibers comprise 40 wt % or more and 99 wt % or less of alumina and 60 wt % or less and 1 wt % or more of silica.
6. The disk roll base material according to any of 1 to 5, wherein the ceramic fibers comprise 70 wt % or more and 80 wt % or less of alumina and 30 wt % or less and 20 wt % or more of silica.
7. The disk roll base material according to any of 1 to 6, which further comprises pulp and starch.
8. A method for producing the disk roll base material according to any of 1 to 7, comprising:
   preparing slurry that comprises ceramic fibers, an inorganic binder and scaly silica; and
   molding the slurry and drying a molded product.
9. A disk roll that is produced from the base material according to any of 1 to 7.
10. The disk roll according to 9 that has a Shore D hardness of 30 to 70 and a density of 1.0 to 1.5 g/cm$^3$.
11. A method for producing a disk roll comprising:
    forming a plurality of ring-shaped disks from the base material according to any of 1 to 7;
    fitting by insertion the plurality of disks to a shaft to obtain a roll-like stack; and
    compressing the stack from the both ends by means of a fixture to fix the stack.
12. A method for producing glass comprising:
    conveying a glass melt by using the disk roll according to 9 or 10; and
    cooling the glass melt.

According to another embodiment of the invention, the following disk roll base material or the like are provided.

1. A disk roll base material comprising ceramic fibers, an inorganic binder and scaly alumina.
2. The disk roll base material according to 1, wherein the scaly alumina is a secondary aggregate in which the scaly alumina is piled in parallel with each other or a tertiary aggregate in which a plurality of the secondary aggregates are aggregated.
3. The disk roll base material according to 1 or 2, which comprises:
   30 to 50 wt % of the ceramic fibers;
   5 to 50 wt % of the inorganic binder; and
   5 to 50 wt % of the scaly alumina
4. The disk roll base material according to any of 1 to 3, wherein the inorganic binder is kibushi clay and bentonite.
5. The disk roll base material according to any of 1 to 4, wherein the ceramic fibers comprise 40 wt % or more and 99 wt % or less of alumina and 60 wt % or less and 1 wt % or more of silica.

6. The disk roll base material according to any of 1 to 5, wherein the ceramic fibers comprise 70 wt % or more and 80 wt % or less of alumina and 30 wt % or less and 20 wt % or more of silica.
7. The disk roll base material according to any of 1 to 6, which further comprises pulp and starch.
8. A method for producing the disk roll base material according to any of 1 to 7, comprising:
   preparing slurry that comprises ceramic fibers, an inorganic binder and scaly alumina; and
   molding the slurry and drying a molded product.
9. A disk roll that is produced from the base material according to any of 1 to 7.
10. The disk roll according to 9 that has a Shore D hardness of 30 to 70 and a density of 1.0 to 1.5 g/cm³.
11. A method for producing a disk roll comprising:
    forming a plurality of ring-shaped disks from the base material according to any of 1 to 7;
    fitting by insertion the plurality of disks to a shaft to obtain a roll-like stack; and
    compressing the stack from the both ends by means of a fixture to fix the stack.
12. A method for producing glass comprising:
    conveying a glass melt by using the disk roll according to 9 or 10; and
    cooling the glass melt.

According to the invention, it is possible to provide, without using mica as an essential component, a disk roll having well-balanced wear resistance and change percentage of outer diameter, and a base material thereof.

MODE FOR CARRYING OUT THE INVENTION

Figure 1:
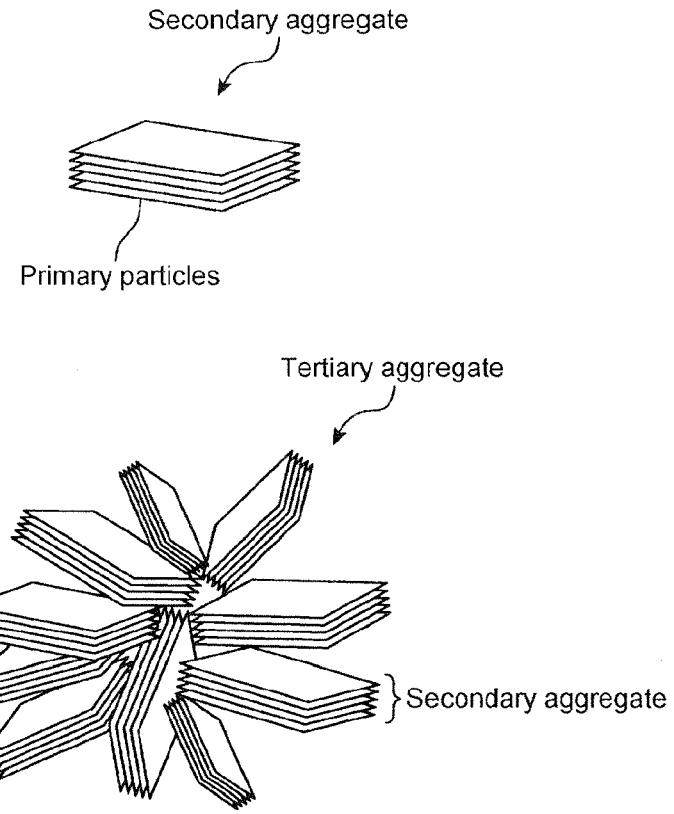
FIG. 1 is a schematic view of secondary particles and tertiary particles of scaly silica that can be used in the invention.

The base material for a disk roll of the invention comprises ceramic fibers (alumina silicate fibers, mullite fibers, alumina fibers or the like), an inorganic binder and one or more fillers selected from scaly silica and scaly alumina. The base material for a disk roll does not contain mica.

The "scaly" shape as referred to herein means a substantially plate-like shape, and it may be partially or entirely bent, or twisted.

The base material comprises ceramic fibers preferably in an amount of 30 to 50 wt %, more preferably 33 to 45 wt %, and further more preferably 35 to 43 wt %. If the amount of ceramic fibers is less than 30 wt %, heat resistance and resistance to thermal shock may be lowered. If the amount of ceramic fibers exceeds 50 wt %, the bulk density of the disk may be lowered to make the disk bulky, resulting in poor workability.

The ceramic fibers used in the invention normally contain alumina in an amount of 40 wt % or more and 99 wt % or less, preferably 40 wt % or more and 80 wt % or less, more preferably 70 wt % or more and 80 wt % or less, and further preferably 70 wt % or more and 75 wt % or less. The ceramic fibers normally contain silica in an amount of 1 wt % or more and 60 wt % or less, preferably 20 wt % or more and 60 wt % or less, more preferably 20 wt % or more and 30 wt % or less, and further preferably 25 wt % or more and 30 wt % or less.

Heat resistance is increased with an increase in the amount of alumina. The fibers may be used singly or in a mixture of two or more.

The base material contains an inorganic binder preferably in an amount of 5 to 50 wt %, more preferably 10 to 48 wt %, more preferably 15 to 45 wt %, and further preferably 20 to 45 wt %. If the amount of the inorganic fibers is less than 5 wt %, sufficient wear resistance may not be obtained. If the amount of the inorganic binder exceeds 50 wt %, productivity may be lowered.

As the inorganic binder, kibushi clay, bentonite, kaolin clay, colloidal silica, alumina sol or the like are exemplified. Preferably, kibushi clay and bentonite are used together. Kibushi clay is contained in an amount of 2 to 30 wt %, preferably 5 to 25 wt % and more preferably 10 to 20 wt %. By including kibushi clay with this amount range, the surface lubricity (smoothness) is improved.

Bentonite is contained in an amount of 2 to 30 wt %, preferably 5 to 25 wt %, with 10 to 25 wt % being more preferable. If bentonite is not contained, drainage becomes poor due to insufficient fixation and aggregation. On the other hand, if the amount of bentonite is too high, the viscosity of slurry may be increased, resulting in poor drainage.

In the invention, as the filler, scaly silica or scaly alumina is contained. Both of the scaly silica and the scaly alumina may be contained. It is preferred that a filler other than the scaly silica and the scaly alumina (silica (sphere or non-aggregate), alumina (sphere), fired kaoline, talc, cordierite or the like) be not contained.

In the invention, the scaly silica may be used in the state in which individual scaly silica is dispersed or may be used in the form of an aggregate or a mass. Scaly silica preferably used in the invention is a foliate silica secondary particle that is formed by piling up of a plurality of lamellar primary particles of the scaly silica in which the surfaces of the lamellar primary particles are oriented in parallel with each other with spaces therebetween. The scaly silica primary particles are piled up irregularly to generate a large number of gaps (voids or pockets). The "irregularly piling up" means not only a case in which the surfaces of two scaly particles are perfectly overlapped, but also a case they are piled up in various spatial positional relationships, i.e. overlapping of part of a surface and another part of a surface, piling of a surface and a side, a side and a side, or the like. The foliate silica secondary particles may be three-dimensionally aggregated to form a tertiary particle. FIG. 1 is a schematic diagrammatical view showing primary particles, secondary particles and tertiary particles. Tertiary particles are formed by irregular aggregation of secondary particles, for example, secondary particles aggregate to form a tertiary particle such that they spread from the center towards the outside, like a flower. As for foliate silica secondary and tertiary particles, description is made in JP-A-2006-143666, Japanese Patent No. 3795671 or the like.

The foliate silica secondary particle is substantially foliate silica having a multi-layer structure composed of lamellar primary particles as the basic structural unit, which foliate silica is formed of the primary particles being piled up in such a manner that the surfaces of the particles are oriented in parallel with each other.

The lamellar primary particle is significantly thin scaly silica. The thickness thereof is not limited, but normally 0.001 to 0.1 μm. The lamellar primary particles form a foliate silica secondary particle by piling up in such a manner that the surfaces of thereof are oriented in parallel with each other. The thickness of the secondary particles is not limited, but normally 0.001 to 3 μm. The aspect ratio (the ratio of the longest length of the foliate silica secondary particles (plate) relative to the thickness) is not limited, but normally at least 10, preferably 30 or more, and further preferably 50 or more. The shortest length of the foliate silica secondary particles (plate) relative to the thickness is not limited, but normally at least 2, preferably 5 or more, and further preferably 10 or more. The aspect ratio can be obtained by measuring by means of a ruler or the like the thickness, the longest length and the shortest length of particles in an image of a sufficiently large number of primary particles taken by a scanning electron microscope (average value). The secondary particles are normally present individually without being fused to each other.

The average particle size of the foliate silica secondary particles is not limited, but normally 0.001 to 30 μm, preferably about 0.01 to 20 μm. If the particles are sphere, the particle size indicates the diameter. If the particles are not sphere, the particle size indicates the maximum diameter. The specific surface area is not restricted, but normally 10 to 1000 m$^2$/g, preferably 20 to 500 m$^2$/g. The amount of a silanol group is not limited, but normally 1000 to 10000 μmol/g, preferably 3000 to 8000 μmol/g.

The average particle size can be measured by means of a Coulter counter (MA-II, manufactured by Coulter Electronics, Inc., for example.) or the like. The silanol group can be measured by the IR spectrum (3600 to 3700, 3400 to 3500 cm$^{-1}$).

The thickness and the length of the foliate silica secondary particles means the average value of the thickness and the length of the secondary particles.

The foliate silica secondary particles used in the invention are known, as a material, as the so-called silica-X and silica-Y. As already mentioned above, the foliate silica secondary particles are leaf-like particles formed by piling up of lamellar primary particles of small scaly silica in such a manner that the surfaces thereof are oriented in parallel with each other.

Foliate silica secondary particles can be produced by a method in which active silicic acid, silica sol, aerosil, silica hydrogel, silica gel (silica xerogel) or the like as the starting materials is subjected to a hydrothermal treatment in the presence of an alkali metal to form a silica tertiary aggregate particle (tertiary particle) in which foliate silica secondary particles are irregularly and three-dimensionally piled up, and the aggregate is then subjected to various post treatments such as pulverization and drying, whereby the tertiary particle is pulverized to obtain foliate silica secondary particles.

The form of the foliate secondary silica particles can be selected from any of water slurry, powder and organic medium slurry. The powder form is preferable. In the invention, a tertiary particle can be used.

The above-mentioned hydrothermal treatment can be conducted by heating in a heat pressure vessel such as an autoclave. The treatment temperature is 150 to 220° C., for example, and the treatment time is about 3 to 50 hours, for example.

The thus obtained silica tertiary aggregate particles are washed with water and subjected to solid-liquid separation by means of a solid-liquid separation/water washing apparatus. The resultant is further subjected to repulping with water to obtain water slurry having an SiO$_2$ concentration of 1 to 30 mass %. The slurry is supplied to a wet-type pulverizing apparatus (crushing apparatus), e.g. a wet-type beads mill, a wet-type ball mill, or a thin film spin system high-speed mixer, thereby to crush the silica tertiary aggregate particles, whereby water slurry of foliate silica secondary particles can be obtained. The water slurry is dried to obtain powder.

As for the foliate silica secondary particles and tertiary particles, commercially available products may be appropriately used. For example, Sun Lovely or the like produced by the AGC Si-Tech Co., Ltd. can be given.

The scaly alumina that is preferably used in the invention is not particular restricted. However, it normally has an average thickness of 0.01 to 1 μm, an average particle diameter of 0.5 to 50 μm and an aspect ratio (the ratio of the particle size to the thickness) of 5 to 500 (preferably 10 to 70). Because of the shape, the alumina scales tend to orient to be in the form of multi-layer stack.

Although no specific restrictions are imposed on the scaly alumina, it is preferable to contain a-alumina as the main component in respect of chemical stability or the like.

The scaly alumina particles can be produced by the hydrothermal synthesis method stated in JP-A-H06-316413 or JP-A-H09-59018, for example. In this hydrothermal synthesis method, sodium hydroxide, sodium silicate, phosphoric acid or the like are added to aluminum hydroxide as a crystal control agent. As a result, a particle having a small thickness and thus having a large aspect ratio (diameter/thickness of scaly particles) is formed. Further, by selecting synthesis conditions, scaly alumina particles that have arbitrary controlled particle sizes and have a narrow particle size distribution can be obtained.

Commercially available scaly alumina can be used appropriately. Serahf manufactured by Kinseimatec Co., Ltd. or the like can be given, for example The base material comprises a filler preferably in an amount of 5 to 50 wt %, more preferably 7 to 40 wt %, and more preferably 10 to 35 wt %. The base material comprises scaly alumina preferably in an amount of 10 to 25 wt %. If the amount of the filler is less than 5 wt %, the surface lubricity (smoothness) of the roll after assembly is lowered. If the amount of the filler exceeds 50 wt %, punching property when the base material is punched in the form of a ring may be lowered.

The base material of the invention may contain a coagulant, an organic binder or the like in addition to the above-mentioned components within an amount range that does not impair the advantageous effects of the invention.

As the organic binder, organic fibers (pulp) and starch are preferable. If the base material contains organic fibers (pulp), compression properties can be exhibited. The amount of organic fibers may be 2 to 10 wt % or 6 to 10 wt %, for example. If it comprises starch, the disk can exhibit high strength. The amount of starch may be 1 to 10 wt % or 1 to 4 wt %, for example.

The total amount of the inorganic components, ceramic fibers, an inorganic binder and an inorganic filler may be 90 wt % or more, 95 wt % or more, 98 wt % or more, 99% or more and 100 wt %.

Further, the total amount of ceramic fibers, an inorganic binder and an organic filler may be 90 wt % or more, 95 wt % or more, 98 wt % or more, 99 wt % or more and 100 wt % or more of the entire base material.

By incorporating the above-mentioned components in the above-mentioned amount ranges, a disk roll having wear resistance and variation percentage of outer diameter in a well-balanced manner can be obtained without using mica. The heat resistance such as heat shrinkage poses no practical problems.

The base material can be produced, for example, by a dehydration molding method in which slurry is supplied to one side of a molding die such as a wire net and the supplied slurry is sucked from the other side. Specifically, slurry containing specific amounts of ceramic fibers, kibushi clay, bentonite, a filler, and optionally a coagulant and/or, an organic binder is prepared if necessary, and this slurry is molded, followed by drying. The thickness can be appropriately set and is normally 2 to 30 mm.

Next, an explanation will be made on the method for producing a disk roll. Normally, ring-like disks are punched out from the base material. The disks are fitted by insertion to a metal (iron, for example)-made shaft to obtain a roll-like stack. The entire stack is pressed from the both ends through flanges arranged at the both ends, and fixed by means of fixtures such as nuts in the state where the disks are slightly compressed. If necessary, firing is conducted. Firing is conducted before or after the filling of the disks to the shaft. It is preferred that firing be conducted after the filling. By grinding the outer peripheral surface of the disks in order to attain a prescribed roll size, a disk roll can be obtained.

The hardness of the disk roll is normally 30 to 70, preferably 35 to 65.

The density of the disk roll is normally 1.0 to 1.5 g/cm$^3$, with 1.1 to 1.4 g/cm$^3$ being preferable.

As for the structure of the disk roll, one in which the entire shaft is covered by the disks, one in which part of the shaft to be in contact with glass is covered by the disks, one having a single axis or the like can be mentioned.

Figure 2:
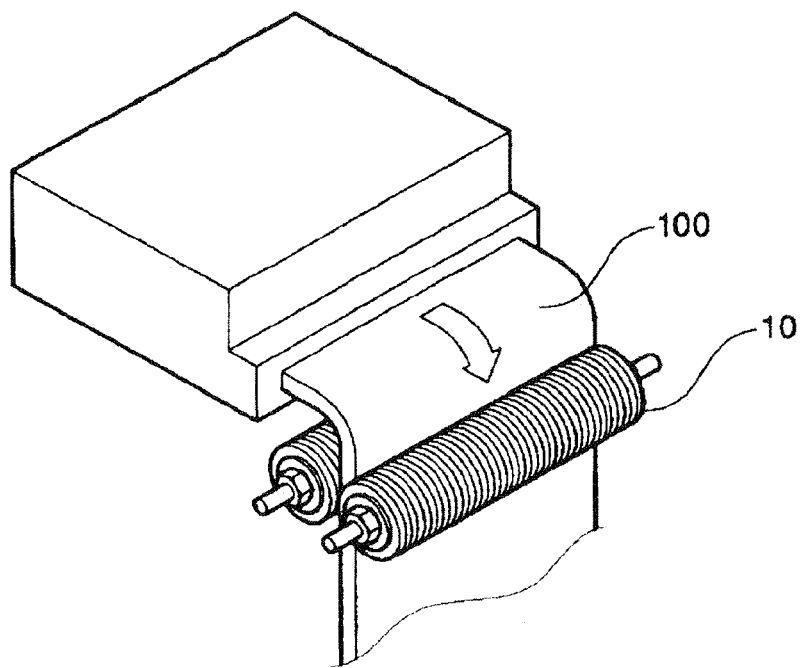
FIG. 2 is a view showing one example of a method for producing glass using a disk roll.

As shown in FIG. 2, a glass melt 100 is disposed and conveyed by using a disk roll 10 of the invention, and the glass melt 100 is cooled and cured, thereby to produce glass.

EXAMPLES

Example 1

As shown in the amount ratios (wt %) in Table 1, water slurry containing 40 wt % of refractory inorganic fibers (mullite fibers comprising 70 wt % or more of alumina and 30 wt % or less of silica), 32 wt % of a scaly silica tertiary aggregate, 10 wt % of kibushi clay, 10 wt % of bentonite, 6 wt % of pulp and 2 wt % of starch was prepared. The water slurry was subjected to suction dehydration molding, whereby a base material for a disk roll (mill board) having a dimension (after drying) of 200 mm×200 mm×6 mm was molded.

For the thus obtained material for the disk roll, the following evaluations (1) to (3) were conducted. The results are shown in Table 1.

(1) Bending Strength

The base material for a disk roll as it was, or after being retained in a heating furnace kept at 500° C. to 1000° C., was naturally cooled to room temperature. From the cooled base material, a test specimen having a width of 30 mm and a length of 150 mm was cut out, and the bending strength thereof was measured by using Autograph AG-100kND manufactured by Shimadzu Corporation in accordance with JIS K7171. In respect of wear resistance, a high bending strength is preferable. Although it depends on application, a practically preferable bending strength is 0.4% or more. More preferably, the bending strength is 0.5% or more, with 1% or more being further preferable.

(2) Change Percentage of Outer Diameter (Expansion Ratio)

From the base material for the disk roll, disks having an outer diameter of 60 mm and an inner diameter of 20 mm were punched out. The disks were assembled to a 20 mm-diameter stainless-made shaft in the form of a roll such that the length and the density after the assembly became 100 mm and 1.35 g/cm$^3$, respectively, whereby a disk roll was prepared.

This disk roll was put in an electric furnace kept at 900° C. After the lapse of 15 hours, the disk roll was taken out and quenched to room temperature (25° C.). This cycle of heating and quenching was repeated until a crack was formed or disk separation occurred.

After the test, the percentage change of the outer diameter (expansion ratio) of the roll was measured. Since the roll is used for the production of thin plate glass, a variation in the outer diameter of the roll affects the quality (thickness) of the glass. Therefore, it is preferred that a percentage change of the outer diameter of the roll by heating be small.

The Shore D hardness of the disk before the test and the Shore D hardness of the disk after a crack was formed or disk separation occurred (after the test) were respectively evaluated.

(3) Wear Resistance Test

From the base material for a disk roll, disks having an outer diameter of 80 mm and an inner diameter of 20 mm were punched out. The disks were assembled to a 20 mm-diameter stainless-made shaft in the form of a roll such that the length and the density after the assembly became 100 mm and 1.35 g/cm$^3$, respectively, whereby a disk roll was prepared.

In the state where a prism-shaped stainless-made shaft (28 mm×28 mm×120 mm) was in contact with the roll surface of this disk roll, the disk roll was rolled at room temperature for one hour. Thereafter, the depth of a groove formed on the roll surface of the disk roll was measured. A smaller groove depth is preferable. Although it depends on application, a practically preferable groove depth is 2.0 mm or less. More preferably, the groove depth is 1.8 mm or less, with 1.5 mm or less being further preferable.

Examples 2 to 4

Base materials for a disk roll and disk rolls were produced and evaluated in the same manner as in Example 1, except that the amounts of the raw materials such as the scaly silica were changed as shown in Table 1. The results are shown in Table 1.

Comparative Examples 1 and 2

Base materials for a disk roll and disk rolls were produced and evaluated in the same manner as in Example 1, except that white mica (200C, manufactured by Western Japan Trading Co., Ltd., aspect ratio 45 on average) or sphere alumina (A-42-2, manufactured by Showa Denko K. K.) was used instead of the scaly silica. The results are shown in Table 1.

TABLE 1

| | | Ex. 1 | Ex. 2 | Ex. 3 | Ex. 4 | Com. Ex. 1 | Com. Ex. 2 |
|---|---|---|---|---|---|---|---|
| Amount ratio | Mullite fibers | 40.0 | 40.0 | 40.0 | 40.0 | 40.0 | 40.0 |
| | Scaly silica | 32.0 | 20.0 | 15.0 | 10.0 | | |
| | White mica | | | | | 32.0 | |
| | Spherical alumina | | | | | | 32.0 |
| | Kibushi clay | 10.0 | 10.0 | 15.0 | 20.0 | 10.0 | 10.0 |
| | Bentonite | 10.0 | 22.0 | 22.0 | 22.0 | 10.0 | 10.0 |
| | Pulp | 6.0 | 6.0 | 6.0 | 6.0 | 6.0 | 6.0 |
| | Starch | 2.0 | 2.0 | 2.0 | 2.0 | 2.0 | 2.0 |
| | Coagulant | 1.0 | 1.0 | 1.0 | 1.0 | 0.5 | 1.0 |

TABLE 1-continued

|  |  |  | Ex. 1 | Ex. 2 | Ex. 3 | Ex. 4 | Com. Ex. 1 | Com. Ex. 2 |
|---|---|---|---|---|---|---|---|---|
| Molding | Drainage time | Second | 16 | 17 | 17 | 18 | 16 | 21 |
| Raw board | Bending strength (MPa) | Normal state | 2.9 | 3.4 | 4.4 | 5.2 |  | 4.6 |
|  |  | 500° C. × 3 hr | 0.6 | 1.5 | 2.1 | 2.2 | 0.4 | 0.5 |
|  |  | 700° C. × 3 hr | 0.9 | 2.7 | 3.2 | 3.0 | 0.7 | 1.0 |
|  |  | 900° C. × 3 hr | 1.4 | 4.1 | 4.4 | 3.2 | 1.0 | 1.6 |
|  |  | 1000° C. × 3 hr | 1.8 | 4.1 | 3.8 | 3.0 | 1.2 | 1.7 |
| Disk roll | Mounted density | g/cm³ | 1.35 | 1.35 | 1.35 | 1.35 | 1.35 | 1.35 |
|  | Hardness | Before test | 57 | 57 | 56 | 51 | 46 | 43 |
|  | (Shore D) | After test | 60 | 60 | 59 | 56 | 52 | 47 |
|  | Percentage change of outer diameter | % | 0.3 | 0.3 | 0.3 | 0.3 | 0.6 | 0.3 |
|  | Wear amount | (mm) | 0.8 | 1.1 | 1.2 | 1.2 | 1.0 | 2.1 |

Examples 5 to 8

Scaly alumina was used instead of the scaly silica. Base materials for a disk roll and disk rolls were produced and evaluated in the same manner as in Example 1, except that the amounts of the raw materials such as the scaly alumina were changed as shown in Table 2. The results are shown in Table 2.

TABLE 2

|  |  |  | Ex. 5 | Ex. 6 | Ex. 7 | Ex. 8 |
|---|---|---|---|---|---|---|
| Amount ratio | Mullite fibers |  | 40.0 | 40.0 | 40.0 | 40.0 |
|  | Scaly alumina |  | 10.0 | 15.0 | 20.0 | 32.0 |
|  | Kibushi clay |  | 20.0 | 15.0 | 10.0 | 10.0 |
|  | Bentonite |  | 22.0 | 22.0 | 22.0 | 10.0 |
|  | Pulp |  | 6.0 | 6.0 | 6.0 | 6.0 |
|  | Starch |  | 2.0 | 2.0 | 2.0 | 2.0 |
|  | Coagulant |  | 1.0 | 1.0 | 1.0 | 1.0 |
| Molding | Drainage time | Second | 17 | 16 | 16 | 17 |
| Raw board | Bending strength (MPa) | Normal state | 4.3 | 4.5 | 3.7 | 3.8 |
|  |  | 500° C. × 3 hr | 1.3 | 1.2 | 0.9 | 0.6 |
|  |  | 700° C. × 3 hr | 2.2 | 2.1 | 1.5 | 0.7 |
|  |  | 900° C. × 3 hr | 3.6 | 2.5 | 2.4 | 1.0 |
|  |  | 1000° C. × 3 hr | 3.3 | 2.5 | 2.2 | 1.2 |
| Disk roll | Mounted density | g/cm³ | 1.35 | 1.35 | 1.35 | 1.35 |
|  | Hardness | Before test | 53 | 52 | 53 | 44 |
|  | (Shore D) | After test | 55 | 50 | 51 | 49 |
|  | Percentage change in outer diameter | % | 0.2 | 0.2 | 0.2 | 0.3 |
|  | Wear amount | (mm) | 1.7 | 1.8 | 1.9 | 1.8 |

From the above results, it can be confirmed that the disk rolls of the examples were excellent in wear resistance or heat resistance. The disk rolls in the examples exhibited high hardness at the same density after assembly as compared with the mica-incorporated roll of Comparative Example 1.

INDUSTRIAL APPLICABILITY

The disk roll of the invention can be used for the production of plate glass, in particular for glass for liquid crystals or glass for plasma displays.

Although only some exemplary embodiments and/or examples of this invention have been described in detail above, those skilled in the art will readily appreciate that many modifications are possible in the exemplary embodiments and/or examples without materially departing from the novel teachings and advantages of this invention. Accordingly, all such modifications are intended to be included within the scope of this invention.

The documents described in the specification of a Japanese application on the basis of which the present application claims Paris convention priority are incorporated herein by reference in its entirety.

The invention claimed is:

1. A disk comprising ceramic fibers, an inorganic binder and scaly silica, wherein the ceramic fibers comprise 70 wt % or more and 80 wt % or less of alumina and 30 wt % or less and 20 wt % or more of silica.

2. The disk according to claim 1, wherein the scaly silica is a secondary aggregate in which the scaly silica is piled in parallel with each other or a tertiary aggregate in which a plurality of the secondary aggregates are aggregated.

3. The disk according to claim 1, which comprises:
   30 to 50 wt % of the ceramic fibers;
   5 to 50 wt % of the inorganic binder; and
   5 to 50 wt % of the scaly silica.

4. The disk according to claim 1, wherein the inorganic binder is kibushi clay and bentonite.

5. The disk according to claim 1, which further comprises pulp and starch.

6. A method for producing the disk according to claim 1, comprising:
   preparing slurry that comprises ceramic fibers, an inorganic binder and scaly silica;
   molding the slurry and drying a molded product, to form a disk roll base material; and
   punching a ring-like disk from the disk roll base material.

* * * * *